United States Patent

[11] 3,620,967

[72] Inventor Graham L. Gulick
 Chicago, Ill.
[21] Appl. No. 725,940
[22] Filed May 1, 1968
[45] Patented Nov. 16, 1971
[73] Assignee Quvoe Chemical Industries
 Schiller Park, Cook County, Ill.

[54] REREFINING OF WASTE CRANKCASE AND LIKE OILS
 11 Claims, No Drawings
[52] U.S. Cl. ................................................. 208/179,
 208/181
[51] Int. Cl. ................................................. C10m 11/00
[50] Field of Search .......................................... 208/179,
 180, 181, 186, 183

[56] References Cited
 UNITED STATES PATENTS
1,619,869 3/1927 Jackson ........................ 208/179
1,777,722 10/1930 Grisbaum ..................... 208/179
1,842,983 1/1932 Hanke .......................... 208/181
3,278,657 10/1966 Clements et al. .............. 208/180
2,131,139 9/1938 Ernest et al. .................. 208/180

Primary Examiner—Delbert E. Gantz
Assistant Examiner—J. M. Nelson
Attorney—Greist, Lockwood, Greenawalt & Dewey ABSTRACT: A method of treating waste crankcase and like oils to remove impurities therein which are suspended by high detergent and like additives. A method is disclosed for adding chemical compounds which disrupt the gas and liquid films adsorbed on the colloidal sized contaminant particles, particularly iron and iron-containing compounds, which are held in suspension by the detergent additives. It is preferred to use compounds which generate free hydroxyl radicals, such as hydrogen peroxide and other peroxide compounds, as well as metal halides such as aluminum chloride, ferric chloride, methyl magnesium bromide, and the like, preferably in a basic medium, with agitation or heating, or both, of the oil. The treatment removes colloidal iron as well as organometallic iron contained in the oil. Precipitation of components of the bottom sediment and water fraction of waste crankcase oil is followed by drawing off of the top layer of oil which may then be further treated, or which may be fed to a still for distillation and fractionation thereof.

REREFINING OF WASTE CRANKCASE AND LIKE OILS

BACKGROUND OF THE INVENTION

1. Field of the Invention

The field of the invention is that of treating waste crankcase oil so that the same may be reclaimed for subsequent use as lubricating oil, fuel oil, or the like.

More particularly, one aspect of the field of the invention is that of waste crankcase oil chemical treatment which is directed to desorption of materials bound to the impurities which are suspended in the oils by means of a free hydroxyl radical or other chemical treatment, which may create an electron transfer in a largely nonaqueous medium which is sufficient to disrupt protective colloids associated with the suspended impurities.

In another aspect, the invention is directed to the use of metal-containing compounds for reaction with the organometallic iron or other compounds, as well as colloidally dispersed iron-containing compounds, which may not be removable from waste crankcase oil by ordinary means. The field of the invention is also that of successive stepwise oil re-refining using the materials described, in various sequences to provide partial or relatively complete oil re-refining, so that the end product is purified only to the necessary extent in view of the proposed end use thereof.

1. Description of the Prior Art

Methods for treatment of used or waste crankcase or other like engine or industrial lubricating oils are known in the prior art, and typically, such treatments are directed to an acid treatment followed by a neutralizing base treatment, filtration of precipitated impurities, and fractional distillation of the sediment-free product thus obtained to produce a so-called re-refined crankcase oil for use as a lubricant or fuel oil.

Recently, treatments have been proposed which used metal oxides or like catalysts for rehydrogenation of used lubricating oils. Other methods have been used which include the use of surface active agents of a nonionic type whose solubility decreased with increasing temperatures, in an attempt to insolubilize the impurities and the surface active agents together for removal thereof.

However, for one reason or another, some of which will be discussed in greater detail herein, none of these methods has proved to be entirely satisfactory. Recently, known processes of re-refining of waste crankcase oil have become unsatisfactory, because it is not economically feasible to perform the treatments necessary to remove some of the impurities from the used crankcase oil, and, in some cases, no successful technology of any kind exists in this field, for reasons which will now be discussed.

In the motor oil industry, it is now an almost universal practice to include detergents and the like in lubricating oils, so virtually all impurities may be suspended in the oil until it is sufficiently contaminated to be drained from the crankcase. Automotive-type oil filters, although very common, are used only to remove large-sized particles.

Although operation of a conventional gasoline or diesel engine results in exposing the crankcase oil to contamination with water vapor condensation, dilution by fuel and fuel vapors, contamination by fuel additives, as well as additional contamination which occurs by way of dust or dirt entering the crankcase breathers, the principal source of crankcase oil contamination occurs by reason of wear on the cylinder walls, bearings and the like, which create considerable amounts of very finely divided iron and iron-containing particles. At any rate, all these contaminants are suspended in waste or used oils.

The use of motor oil detergents has become common in the industry to the extent that not only conventional detergents, such as calcium and barium sulfonates, as well as wholly organic detergents such as succinimides and the like are used in significant amounts, but to a point where these and other detergents and additives obtain such effective dispersion of waste material in the oil that separation thereof from the used oil after use is impossible by physical means on anything approaching a commercial scale.

The problem of reclaiming oil containing such detergents and additives has been recognized and acknowledged in the waste crankcase oil treating field, but the desirability of using such additives to keep contaminants suspended in the oil has so far, at least as far as oil refiners are concerned, outweighed the need for a crankcase oil which could be readily re-refined for subsequent use on an economically justifiable basis.

Since it is now known that re-refined crankcase oil is in every material respect as good for lubricating oil as originally refined oil, the most significant barrier to such reuse of oil is the problem, heretofore unsolved, of removing contaminant particles which are suspended in used oil by extremely effective detergents.

In addition to the economic desirability of re-refining used crankcase oils, however, the matter of reuse thereof is becoming increasingly important from a conservation standpoint, because lubricating oils are not biodegradable, and accordingly, disposal thereof presents a hazard in the nature of potential water contamination and the like.

Accordingly, there has been a genuine need for a method of re-refining crankcase oils so that they could be reused as lubricants, made acceptable for use as fuel oils, or both.

There has also been a need for simple chemical oil treatment which will disrupt the equilibrium of the detergent system which holds the impurities or contaminant particles in suspension in waste crankcase oil so that such impurities may be removed by decanting, filtration, or like methods not requiring extremely strong, harsh chemicals, or extreme physical treatment, such as high temperature, pressure and the like.

There has also been a need for a re-refining oil process which would initially render waste crankcase oil suitable for use as a fuel oil without the need for further treatment, and wherein the fuel oil thus obtained could be simply treated further to obtain a lubricating oil and which would accomplish these objects at reasonable cost, without the need for elaborate or expensive equipment and materials.

SUMMARY OF THE INVENTION

In view of the shortcomings of the prior art, an object of the invention is to provide a waste crankcase oil treatment process which is simple and effective, and which does not require the formerly conventional acid pretreatment step.

Another object is to provide such a process which requires a minimum of physical treatment after simple chemical treatment with appropriate reagents.

Another object is to provide an oil treatment for re-refining waste crankcase oil which includes treating the waste oil with a compound which generates free hydroxyl radicals, even in a principally nonaqueous medium, in order to disrupt the equilibrium of the colloidal system by which the contaminants are held in suspension in the waste oil.

Still another object is to provide a method which includes the treatment of waste crankcase oil with a metallic halide containing treating compound to precipitate both iron which is colloidally suspended in the oil, as well as iron present in the oil in the form of organometallic compounds.

Another object is to provide such a reclaiming method in which bottom sediment and water which are suspended in the oil may be forced to settle to the bottom in a comparatively rapid time after chemical treatment, facilitating drawing-off of the purified oil from the top of an oil container in a simple manner.

The invention accomplishes these objects, and others which are inherent therein, by providing a method which includes the steps of treating waste crankcase oil with one or more treating compounds comprising free hydroxyl-radical forming compounds and metal halide containing compounds, preferably in a basic medium, and agitating, or heating, or both, the oil thus treated, thereafter allowing the treated oil to settle for a period of time, and drawing-off refined oil from the container holding the oil with the precipitated sediment at the bottom thereof. The process includes breaking the emulsion, and freeing adsorbed gases, such as air, from the stabilized colloidal dispersion to alter the density thereof so as to facilitate settling out of the suspended contaminants.

The exact manner in which these objects are accomplished will become more apparent as the description proceeds, and particularly in the description of the examples which illustrate the practice of the invention.

DESCRIPTION OF THE PREFERRED EMBODIMENTS OF THE INVENTION

As used herein, the expression "waste crankcase oil," hereinafter sometimes referred to as "WCCO," is intended to refer to crankcase drainings from automotive vehicles, including cars, trucks and the like, without limitation to the type of vehicle, type of engine or fuel, or the like, and particularly to random mixtures of such oil collected from many sources, representing literally hundreds of brands, grades and varieties of oil, and contaminants normally associated therewith.

Typically, modern motor oils contain detergent additives, such as calcium or barium sulfonates, or other soaps or soaplike compositions or mixtures, generally those which include a lipophilic portion and a portion which is physically or chemically attracted to the metal and other contaminants found in crankcases, and which is not unduly hydrophilic. Motor oil may also contain agents designed to affect the pour point, viscosity index, oxidation stability, tendency to foam, and the like. Typically, such compounds contain both ionic and nonionic components. Many used motor oils also include inorganic lubricants such as molybdenum compounds, graphite, and extreme pressure additives, which are designed, singly or in combination with other compounds, to serve as wetting agents which are strongly adsorbed on the metals intended to be lubricated.

Today, since automobile engines, for example, are operated at extremely high rotational and linear velocities, and under varying conditions of temperature and humidity, as well as under conditions of acidity, dust and dirt, which are extremely corrosive to engine parts, it is desired by motorists as well as by the oil industry that these contaminants, insofar as they may not be completely volatilized during use, remain in suspension until the crankcase oil is to be drained, since, in this way, the contaminants will be removed from the engine. Furthermore, the suspending agents must have sufficient strength and stability to withstand the conditions to which they are subjected, namely heat, centrifugal force, and the like.

However, the more successful such detergents and other additives are in maintaining this stability, the more difficult it is to remove them when it is desired to do so. To the extent that they are chemically inert, they resist chemical treatment, and to the extent that they physically resemble the body of the oil, that is, in density and the like, they resist physical separation. These problems will be discussed further herein.

However, in spite of these difficulties, the present invention has succeeded in providing a treatment for waste crankcase oil which is effective to create rapid sedimentation of the impurities, release of adsorbed air, and release of water which is chemically and physically bound to the contaminants suspended in the oil.

The principal objection to the use of waste crankcase oils results from the presence of impurities which are generally referred to in the art as "B.S. & W.," that is, "bottom sediment and water," or "bottom solids and water." In addition to B.S. & W., waste oil contains other suspended components generally referred to as "ash forming constituents" which are objectionable, since these are inorganic, soluble or insoluble components which are actual or potential abrasives.

The manner of practicing the invention will now be illustrated by reference to the examples which illustrate the preferred embodiments of the invention.

EXAMPLE 1

About 7,500 gallons of waste crankcase oil were placed in a tank fitted with heating coils, the oil being at room temperature, namely at 60° to 75° F. This oil was a typical waste crankcase oil batch collected from many different service stations in small batches, and represented a typical cross section of used crankcase oils, namely a mixture of detergent oils, nondetergent oils, multiviscosity oils and the like. According to the standard A.S.T.M. method of assaying such oil, which is known in this art, the oil contained about 7 percent B.S. & W. by weight.

The oil contained in the tank was agitated by pumping the oil from the bottom to the top of the tank at a rate of about 100 gallons per minute, while the oil was heated to about 120° F. At this point, 15 gallons of 50 percent by weight aqueous sodium hydroxide was added to the oil which contained 7 percent B.S. & W. The temperature was thereafter raised to 130° F., and 7½ gallons of 30 percent by volume hydrogen peroxide was added to the oil containing the 7 percent B.S. & W. and sodium hydroxide. The agitation was continued, and the temperature was raised to 150° F., following which the oil was pumped to a settling tank. The oil was allowed to settle in the settling tank for a period of 24 hours. The oil was not further heated, but was allowed to cool to room temperature. At the end of 24 hours, the volume of oil above the settled sludge was 6,750 gallons or more. The sludge had settled to the extent that these 6,750 gallons could be easily drawn off without disturbing the bottom sludge. The resultant oil, subjected to testing by the same A.S.T.M. method, assayed ½ percent or less maximum B.S. & W.

Thus, a virtually completely effective separation was attained, since 90 percent or more of the original oil volume was recovered, and the original volume contained at least 7 percent B.S. & W.

When the same procedure was followed, but the peroxide was omitted, after 24 hours of settling, there was no clear line of demarcation between the oil and the sludge, and such an oil tank, sampled at the top and bottom thereof, proved that there was a barely measurable difference between the B.S. & W. content in the two different locations, that is, the B.S. & W. content of both the top and bottom portions of the oil tank were substantially 7 percent. Thus, this example demonstrates the ability of the combined caustic and peroxide, in small quantities, to cause sedimentation of particles which previously defied separation, even with the use of a centrifuge.

EXAMPLE 2

Two thousand gallons of a waste crankcase oil having an initial B.S. & W. content was placed in a tank which included heating coils and a 3-horsepower top entering Eppenbach mixer operating at 7,000 r.p.m. The oil was heated to 120° F., with agitation, and two gallons of 50 percent by weight aqueous sodium hydroxide was added. Heating was continued until the mixture attained a temperature of about 130° F., whereupon 2 gallons of 30 percent by volume hydrogen peroxide were added. The temperature of the agitated oil was then raised to 150° F., and held at 150° F. for 2 hours before being pumped to a storage tank.

This process resulted in a yield of 90 percent or more re-refined oil having a B.S. & W. content of less than 0.01 percent. This example demonstrated the value of agitation and addition of shear and like mechanical energy in removing air and water from the W.C.C.O.

EXAMPLE 3

A process similar to that described in example 1 or 2 was performed, except that potassium hydroxide was substituted for the sodium hydroxide. Results substantially equal to those noted above were obtained.

EXAMPLE 4

Waste crankcase oil was treated as in the examples 1, 2, or 3, except that lithium hydroxide was used, and although the lithium hydroxide is expensive for commercial use, satisfactory results were obtained with the use thereof.

EXAMPLE 5

A process similar to that described in the examples 1, 2, 3 or 4 was carried out, except that a solution of benzoyl peroxide was used in place of the hydrogen peroxide. The substitution of this compound for the hydrogen peroxide did not significantly alter the results obtained.

EXAMPLE 6

A process similar to that described in examples 1 through 4 was carried out, except that a solution of sodium hypochlorite was used in place of the hydrogen peroxide. The substitution of this compound for the hydrogen peroxide as a substitute free hydroxyl-radical generator or source did not significantly alter the results obtained.

EXAMPLE 7

A process similar to that described in the examples 1 through 4 was carried out, except that a solution of calcium hypochlorite was used in place of hydrogen peroxide. The results obtained were similar to those obtained in the above examples.

EXAMPLE 8

A sample of waste crankcase oil was placed in a suitable tank, and up to about 5 percent by weight of an anhydrous aluminum chloride powder was added to the waste crankcase oil. Immediately upon addition of the aluminum chloride, at room temperature, precipitation of a coarse material took place. The waste crankcase oil thus treated was thereupon thoroughly agitated, mixed to a temperature of about 180° F., and allowed to return to ambient temperature. The sediment thus obtained was readily removable by filtration, centrifuging or settling, whereas, before such treatment, the sludge was dispersed and was not able to be separated by these physical means.

Although anhydrous aluminum chloride is relatively expensive for use with waste crankcase oil not previously treated, the effectiveness thereof in removing suspended contaminants was demonstrated by this process.

EXAMPLE 9

In this case, a partly re-refined waste crankcase oil product, which resulted from treatment of waste crankcase oil according to examples 1 or 2, was used as the starting material, and about 0.5 percent by weight of anhydrous aluminum chloride was added over a short period to this pretreated or partially re-refined and settled waste crankcase oil. The oil was heated to about 180° F. over a period of about 1 hour, with agitation, and allowed to return to room temperature, whereupon a significant amount of precipitated product was able to be removed by centrifuging, filtration, drawing off the top layer or the like.

This example demonstrates that anhydrous aluminum chloride is effective to remove colloidally dispersed iron as well as a certain amount of organometallic iron. Whereas the partly refined crankcase oil used in this example was suitable for use as a fuel oil, the product resulting from the aluminum chloride post-treatment was suitable for use as a lubricating oil, in some cases, without the need for additional, formerly conventional steps, such as distilling and the like. Thus, this process demonstrates the advantages of the peroxide-caustic pretreatment, followed by the metal halide treatment to produce a re-refined motor oil.

EXAMPLE 10

A sample of commercially available No. 2 fuel oil was treated in accordance with the method of example 9; however, no heat was applied, but vigorous agitation was supplied. A brown, readily separable precipitate was formed, and the reddish brown color of the fuel oil was lightened significantly, demonstrating the removal of organometallic iron.

In examples 8, 9, and 10, heating, although not strictly necessary, is provided as a means of imparting energy to the mixture as well as to reduce the viscosity of the oil, so that the chloride material can be intimately mixed therein. Thus, the degree of heating, agitation, and mixing are primarily matters of economics and efficiency. Those skilled in the art are aware of variations in these conditions which may be made to bring about desired results.

EXAMPLE 11

A sample of waste crankcase oil was treated by adding between about 0.05 percent and about 2 percent by weight of ferric chloride in the hydrated form, preferably $FeCl_3 \cdot 6H_2O$, while the waste crankcase oil was being heated to between 150° and 175° F., and agitated. At this point, about 0.1 percent to about 1 percent hydrogen peroxide was added to the mixture, and agitation was continued for approximately 1 hour. Thereafter, the product was pumped to a storage tank, and the B.S. & W. content of the oil drawn off from the top thereof was reduced to as little as 0.1 percent or less. This demonstrated the use of the combined ferric chloride and peroxide in breaking the emulsion holding iron and other sediment-forming particles in suspension. In this case, the ferric chloride and peroxide were used without sodium hydroxide or other strong electrolyte.

The above examples illustrate different forms of practicing the invention, which includes refining of waste crankcase oil, and methods of further refining partially refined crankcase oil.

Reference has been made herein to "free hydroxyl radical forming" or "generating" compounds. In addition to those used in the examples, various perchlorates, peracetic acid and like acids, inorganic peroxides, and the like, are known to have such effects, which are also exhibited to a greater or less extent by organic ketone peroxides (e.g., methyl ethyl ketone peroxide), and other compounds, known to those skilled in the art. Reference has also been made to "metallic chlorides" or "metallic halides"; in addition to the $FeCl_3$, $AlCl_3$, and their equivalents, Grignard reagents such as alkyl magnesium halides (e.g., $C_3H_5Mg\ Br$) have also proved effective.

Likewise, in the examples, a concentrated sodium hydroxide or like strong base was disclosed for use with the peroxides. The sodium hydroxide and like basic electrolytes listed are preferred for use with the invention. But it is known that, although less effective, and more expensive, sulfuric acid, or like compounds may be substituted for the named strong basic electrolytes, without losing the effectiveness of the hydroxyl radical generating compounds, or certain of the halides. Such acids are not preferred, however.

In the prior art, it was known to be possible to remove chemically most of the detergents and suspended contaminants if enough sulfuric acid of sufficient concentration were used; however, such treatment is very expensive because of the large amounts and high concentrations now required, compared to those amounts and concentrations required when few or no detergents were used in motor oils.

In addition, large quantities of concentrated acid create corrosive sludge, require neutralization which creates additional water, and has other known disadvantages.

By reference to the examples herein, it will be noted also that much less than a stoichiometric quantity of free radical generating material and metal halide containing materials were used, in reference to the percentage of active impurities present in the mixture, thereby indicating that the reaction is at least partly physical, catalytic in nature, or the like, rather than being purely chemical in nature, and this constitutes an advantage of the invention which is obvious, since it makes great economy possible.

Although it is not known with certainty why the materials described herein operate with such unexpected effectiveness and not wishing to be bound by any particular theory or principle of the invention, it is believed that the iron may be dispersed as an aqueous sol in the oil in the form of an internal disperse phase. It is also believed that a great deal of air is adsorbed in the waste crankcase oil mixture, and it is known that adsorption of air or other gas phase on liquids or solids is an exothermic reaction. In this case, it is believed that an air phase is in turn strongly bound to, adsorbed, or held on the exterior of the iron-water sol, with the result that an air "envelope" surrounds the sol, causing the two-part or two-component composite sol to have a density which is substantially exactly equal to that of the continuous oil phase. Therefore, the composite colloidal particle strongly resists centrifugal or settling separation, until this equilibrium is interrupted or displaced. Further, the energy which accompanies this adsorption, bonding, or the like, must be overcome by adding energy to the system, said energy being physical chemical or both.

Thus, in observing the desorption of air from the system when the process of example 1 is being carried out, for example, it can be noted that upon heating and agitation, the air "envelope" will expand and rise to the surface, and, after losing a certain amount of air, will revert to a higher density and sink back into the body of the oil, take on added heat or other energy, rise and expand again, etc., often repeating this cycle many times until the air is completely desorbed from the composite particle, whereupon the remaining particle will precipitate to the bottom.

Further, it is believed that the exterior of the dispersed particles, which may be considered analogous to iron sol surrounded by a protective colloid, has a positive electrical charge which must be dissipated before the particles may coalesce and precipitate. Therefore, it is thought that an electron transfer or like effect must be impressed on these particles, and accordingly, the likelihood of a free radical, or an ionic reaction of some type is postulated. Since the oil is not an electrolyte, heretofore developed theories relating to dispersions in electrolytic media have not seemed to apply to these cases.

A neutralization of these charges is thought to be possibly analogous to reduction or elimination of the zeta potential from colloidal particles in an electrolytic solution, for example. Thus, the exact mechanism of these reactions is not fully understood, however, it is known that large quantities of air are firmly bound into waste crankcase oil, that significant amounts of water are likewise present, and that these may simply and economically be eliminated from waste oil by the processes described herein.

I claim:

1. A method of removing contaminants suspended in waste crankcase oil by detergents and other additives, without substantial destruction of said detergents and other additives, said method comprising selecting a body of said waste crankcase oil, the condition of which is substantially the same as the condition thereof when said oil was removed from said crankcase, and prior to other intentional treatment thereof, treating said body of oil with from about 0.005 percent to about 10 percent by weight of a treating compound which is adapted to generate free radicals, said compound being selected from the class consisting of inorganic peroxides, organic peroxides, hypochlorites, perchlorates, and peracids which are nondestructive to oil detergents and additives, intimately mixing said treating compound with said waste crankcase oil, allowing said treated waste crankcase oil to stand for a period sufficient to allow sedimentation of the contaminants suspended in said oil by said detergents and other additives, and drawing off the oil thus treated from the oil layer above said precipitated contaminants.

2. A method of removing contaminants suspended in waste crankcase oil by detergents and other additives, without substantial destruction of said detergents and other additives, said method comprising treating a body of said waste crankcase oil not previously treated with strong mineral acids with from about 0.005 percent to about 10 percent by weight of a concentrated solution of a compound which, in aqueous solution, forms a strong inorganic base or acid, and with from about 0.005 percent to about 10 percent by weight of a treating compound which is adapted to generate free radicals, said compound being selected from the class consisting of inorganic peroxides, organic peroxides, hypochlorites, perchlorates, and peracids which are nondestructive to oil detergents and additives, intimately mixing said treating compound with said waste crankcase oil, allowing said treated waste crankcase oil to stand for a period sufficient to allow sedimentation of the contaminants suspended in said oil by said detergents and other additives, and drawing off the oil thus treated from the oil layer above said precipitated contaminants.

3. A method as defined in claim 2 in which said treating compound is hydrogen peroxide.

4. A method of removing contaminants suspended in waste crankcase oil by detergents and other additives, without substantial destruction of said detergents and other additives, said method comprising treating a body of said waste crankcase oil not previously treated with strong mineral acids with from about 0.005 percent to about 10 percent by weight of a treating compound which is adapted to generate free radicals, said compound being selected from the class consisting of inorganic peroxides, organic peroxides, hypochlorites, perchlorates, and peracids which are nondestructive to oil detergents and additives, of intimately mixing said treating compound with said waste crankcase oil to stand for a period sufficient to allow sedimentation of the contaminants suspended in said oil by said detergents and other additives, drawing off the oil thus treated from the oil layer above said precipitated contaminants, and thereafter treating the oil thus drawn off with a compound from the class consisting of aluminum chloride and ferric chloride, intimately mixing said chloride compound with said oil, and physically separating precipitated impurities from the body of said oil.

5. A method as defined in claim 2 in which said treating compound is present in substantially less than a stoichiometric quantity relative to the active ingredients in the contaminants in said waste crankcase oil.

6. A method as defined in claim 2 in which said concentrated solution is a solution of an alkaline metal hydroxide.

7. A method of refining waste crankcase oil which includes iron particles colloidally dispersed therein, said iron particles including air and water intimately associated therewith to form a composite colloidal particle, said composite particles being suspended in said oil by a detergent material, said composite colloidal particles having a density substantially equal to the density of the body of said waste crankcase oil, and wherein said composite particles resist precipitation by addition to said oil of dilute acid and caustic solutions, said method comprising, selecting a body of said waste crankcase oil which has not been previously treated with strong mineral acids, and electrolytically altering the electric charge contained in the surface of said composite particles by treatment of said oil with a reactive compound adapted to generate free radicals and selected from the class consisting of inorganic peroxides, organic peroxides, hypochlorites, perchlorates and peracids which are nondestructive to oil detergents and additives, and allowing said composite particles to coalesce and precipitate, while agitating said mixture so as to separate said adsorbed air from said composite particles.

8. A method as defined in claim 2 in which said intimate mixing includes the step of heating said crankcase oil to about 100° F., and physically agitating said oil.

9. A method as defined in claim 2 in which said treating compound is a peroxide compound and in which said intimate mixing includes the step of heating said crankcase oil to above 100° F., and physically agitating said oil.

10. A method as defined in claim 2 in which said intimate mixing comprises heat and agitation, and in which said concentrated solution is a solution of sodium hydroxide.

11. A method of refining waste crankcase oil not previously treated with strong mineral acids and which includes iron particles colloidally dispersed therein, said iron particles including air and water intimately associated therewith to form a composite colloidal particle, said composite particles being suspended in said oil by a detergent material, said composite colloidal particles having a density substantially equal to the density of the body of said waste crankcase oil, and wherein said composite particles resist precipitation by addition to said oil of dilute acid and caustic solutions, said method comprising electrolytically altering the electric charge contained in the surface of said composite particles by treatment of said oil with a reactive compound adapted to generate free radicals and selected from the class consisting of inorganic peroxides, organic peroxides, hypochlorites, perchlorates and peracids which are nondestructive to oil detergents and additives, and allowing said composite particles to coalesce and precipitate, while heating said oil from room temperature to at least 100° F. and agitating said oil so as to separate said adsorbed air from said composite particles.

* * * * *